US011929898B1

(12) United States Patent (10) Patent No.: US 11,929,898 B1
Ittelson et al. (45) Date of Patent: Mar. 12, 2024

(54) VIDEO CONFERENCING QUALITY-OF-SERVICE IN AUTONOMOUS SYSTEMS

(71) Applicant: Zoom Video Communications, Inc., San Jose, CA (US)

(72) Inventors: Brendan James Ittelson, San Jose, CA (US); Patrick John Jensen, Fresno, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 18/217,722

(22) Filed: Jul. 3, 2023

(51) Int. Cl.
*H04L 43/08* (2022.01)
*H04N 7/15* (2006.01)

(52) U.S. Cl.
CPC .............. *H04L 43/08* (2013.01); *H04N 7/15* (2013.01)

(58) Field of Classification Search
None
See application file for complete search history.

(56) References Cited

U.S. PATENT DOCUMENTS

| | | | | |
|---|---|---|---|---|
| 11,470,005 | B2 * | 10/2022 | Mermoud | H04L 45/28 |
| 2019/0379605 | A1 * | 12/2019 | Pfister | H04L 47/125 |
| 2020/0022016 | A1 * | 1/2020 | Fenoglio | H04L 43/08 |
| 2020/0162351 | A1 * | 5/2020 | Szigeti | G06F 9/5072 |
| 2022/0365834 | A1 * | 11/2022 | Chen | G06F 11/0793 |

OTHER PUBLICATIONS

Ericsson Network Performance Visualizer "Offer Your Users The Best 5G Network Performance With Ericsson", Network Performance Leadership, 6 pages.

* cited by examiner

*Primary Examiner* — Atta Khan
(74) *Attorney, Agent, or Firm* — Kilpatrick Townsend & Stockton LLP

(57) ABSTRACT

Techniques for monitoring video conferencing quality-of-service in autonomous systems are disclosed. In an example method, a video conference provider establishes a video conference including a plurality of client devices, in which each client device is connected to an autonomous system of a plurality of autonomous systems. The video conference includes a first client device connected to a first autonomous system administered by a communication service provider (CSP). The video conference provider receives packets from the first client device and determines, from the packets, video conference information including telemetry about the video conference, the first autonomous system traversed by the packets, and the associated CSP. The video conference provider determines one or more metrics about performance of the video conference in the first autonomous system based on the video conference information and outputs the metrics in real-time.

20 Claims, 7 Drawing Sheets

```
                                      600
                                        ↘

┌─────────────────────────────────────────────────────────────────────────┐
│  ESTABLISH A VIDEO CONFERENCE INCLUDING A PLURALITY OF CLIENT DEVICES,  │
│              EACH CLIENT DEVICE CONNECTED TO AN AUTONOMOUS SYSTEM        │
│                                    602                                   │
└─────────────────────────────────────────────────────────────────────────┘
                                        ↓
┌─────────────────────────────────────────────────────────────────────────┐
│  JOIN A FIRST CLIENT DEVICE TO THE VIDEO CONFERENCE, THE FIRST CLIENT   │
│  DEVICE CONNECTED TO A FIRST AUTONOMOUS SYSTEM ADMINISTERED BY A FIRST  │
│                      COMMUNICATION SERVICE PROVIDER                      │
│                                    604                                   │
└─────────────────────────────────────────────────────────────────────────┘
                                        ↓
┌─────────────────────────────────────────────────────────────────────────┐
│           RECEIVE ONE OR MORE PACKETS FROM THE FIRST CLIENT DEVICE       │
│                                    606                                   │
└─────────────────────────────────────────────────────────────────────────┘
                                        ↓
┌─────────────────────────────────────────────────────────────────────────┐
│  DETERMINE, FROM THE ONE OR MORE PACKETS FROM THE FIRST CLIENT DEVICE,  │
│                       FIRST CLIENT DEVICE INFORMATION                    │
│                                    608                                   │
└─────────────────────────────────────────────────────────────────────────┘
                                        ↓
┌─────────────────────────────────────────────────────────────────────────┐
│    STORE THE FIRST CLIENT DEVICE INFORMATION IN ASSOCIATION WITH THE    │
│                      FIRST COMMUNICATION SERVICE PROVIDER                │
│                                    610                                   │
└─────────────────────────────────────────────────────────────────────────┘
                                        ↓
┌─────────────────────────────────────────────────────────────────────────┐
│   DETERMINE, BASED ON THE FIRST CLIENT DEVICE INFORMATION STORED IN     │
│   ASSOCIATION WITH THE FIRST COMMUNICATION SERVICE PROVIDER, ONE OR     │
│   MORE METRICS ABOUT PERFORMANCE OF THE VIDEO CONFERENCE IN THE FIRST   │
│                            AUTONOMOUS SYSTEM                             │
│                                    612                                   │
└─────────────────────────────────────────────────────────────────────────┘
                                        ↓
┌─────────────────────────────────────────────────────────────────────────┐
│  OUTPUT IN REAL-TIME THE ONE OR MORE METRICS ABOUT THE PERFORMANCE OF   │
│  THE VIDEO CONFERENCE IN THE FIRST AUTONOMOUS SYSTEM TO THE FIRST       │
│                     COMMUNICATION SERVICE PROVIDER                       │
│                                    614                                   │
└─────────────────────────────────────────────────────────────────────────┘
```

*FIG. 6*

VIDEO CONFERENCING QUALITY-OF-SERVICE IN AUTONOMOUS SYSTEMS

FIELD

The present application generally relates to network performance monitoring, and more particularly relates to techniques for monitoring video conferencing quality-of-service in autonomous systems.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIG. 6 shows a flowchart of an example method for monitoring video conferencing quality-of-service in autonomous systems, according to some aspects of the present disclosure.

DETAILED DESCRIPTION

Figure 1:
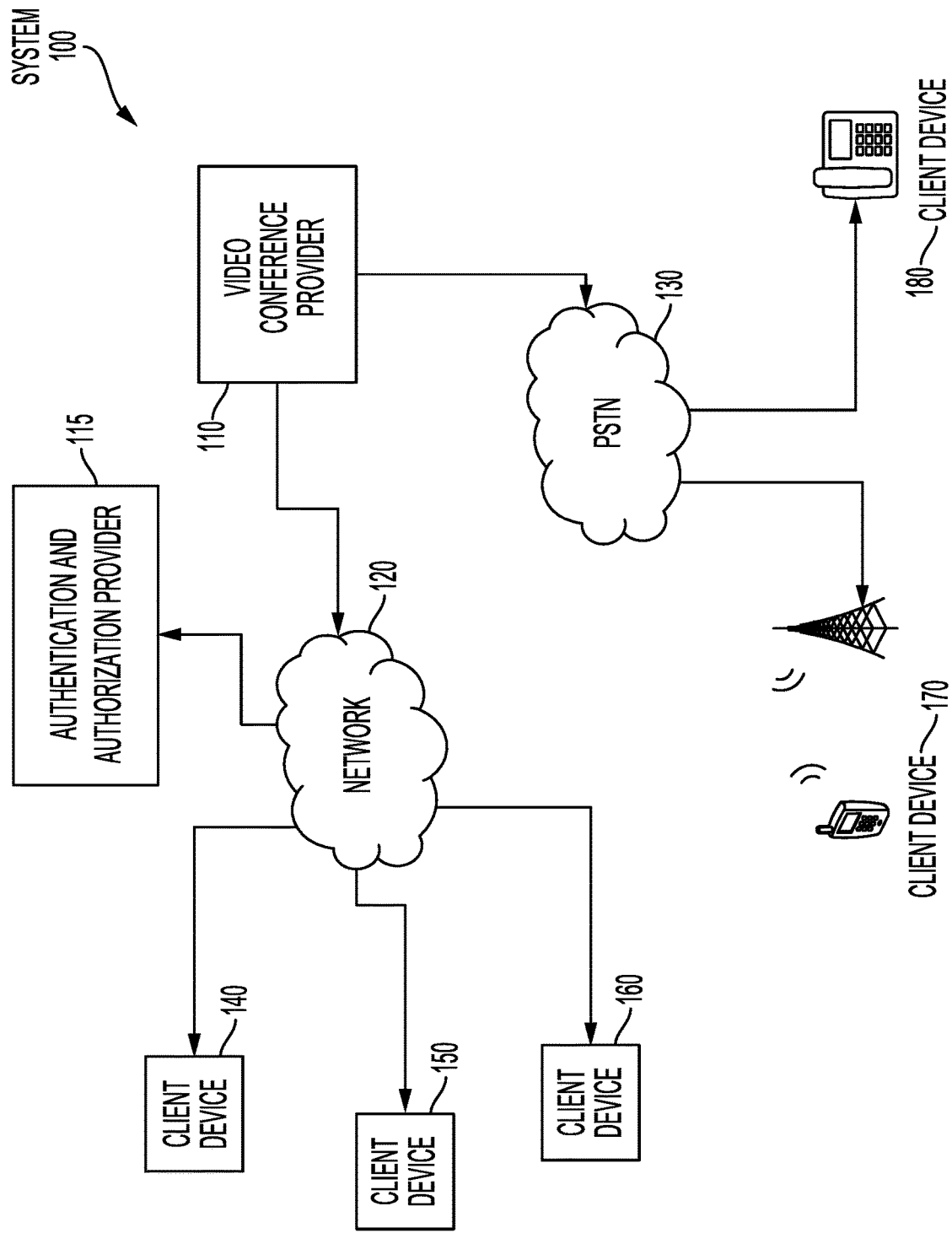
FIG. 1 shows an example system that provides videoconferencing functionality to various client devices, according to some aspects of the present disclosure.

Examples are described herein in the context of techniques for monitoring video conferencing quality-of-service in autonomous systems. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conferencing is an integral part of modern personal and business communications. Indeed, the integration is so substantial that the reliability of video conferencing services may be a significant concern for participants. For example, some enterprises may depend on the availability of reliable video conferencing services for important communications relating to lines of business.

Network performance monitoring can thus play a key role in the maintenance of reliable video conferencing services. In addition to a video conference provider that may provide a platform for the provision and operation of video conferencing services, the network traffic associated with video conferencing services may traverse numerous networks during the course of a video conference. For example, a first video conference participant using a first client device may join a video conference including a second video conference participant using a second client device. The two client devices may be connected to the Internet from geographically disparate locations and communicate using various combinations of networking technologies. The internet protocol (IP) packets making up the network traffic associated with the video conference may, for example, traverse one or more autonomous systems (ASs). ASs can include collections of IP networks managed by a single entity or organization, like a communication service provider (CSP) or large enterprise. ASs may be identifiable through unique AS numbers (ASNs) and may use the border gateway protocol (BGP) to share and update routing information about the network paths between them.

In some examples, a video conferencing provider that hosts a video conference including multiple participants can provide detailed service monitoring to participants or subscriber organizations. In these examples, the video conference provider can provide such monitoring based on telemetry information accessible from the network traffic traversing various intermediate networks enroute to and from the video conference provider. However, the service monitoring provided by the video conference provider may not be accessible to the operators of the intermediate networks between the client devices and the video conference provider. The operators of the intermediate networks may nevertheless be called upon to troubleshoot network failures or issues relating to video conferencing.

For example, a CSP may operate an AS that makes up a portion of the route that video conference network traffic takes between a client device and the video conference provider. The network performance of the AS may affect the performance of the video conferencing service as seen by the various connected client devices. The CSP, lacking access to the telemetry information accessible by the video conference provider, may be unable to detect and respond to performance issues in video conferencing services that are occurring due to network performance errors associated with an AS under their control. Thus, CSPs may operate in a reactive troubleshooting mode, responding to network failures and outages as they are reported. Similarly, CSPs may lack the ability to determine a baseline for adequate network performance for video conference traffic and thus cannot readily detect real-time deviations from normal operations. A baseline may include one or more reference values for network performance metrics that may provide indications of adequate network performance to support video conferencing operations.

Furthermore, while CSPs can monitor some elements of network traffic related to video conferencing that traverse ASs they administer, they cannot determine network performance with any significant granularity. For example, CSPs can monitor some elements associated with individual IP packets. For instance, CSPs may be able to determine the source or destination IP addresses of individual packets.

However, because most video conferencing network traffic is encrypted with technologies like transport layer security (TLS), CSPs may be unable to decrypt encapsulated payloads that include telemetry or information about the video conference. Thus, aggregate performance information relating to regions, groups of users, organizations, particular meetings, services, and so on cannot be determined. Even the source and destination IP addresses may be unreliable bases on which to measure the performance of video conferencing network traffic due to common technologies like virtual private networks (VPNs), network proxies, and dynamic IP assignment.

Techniques for monitoring video conferencing quality-of-service in autonomous systems are provided to address these technological lacunae. In an example method, a video conference provider establishes a video conference for a group of client devices. Each client device is connected to the Internet using a network provided by a CSP that is situated in an AS. An AS is a collection of IP networks and routers that are under the control of one entity, such as a CSP, that have a common routing policy. For example, the group of client devices that are participating in the video conference may include a first client device, connected to a first AS that is administered by a first CSP. The video conference provider is likewise connected to the Internet via one or more ASs. Network traffic exchanged between a given client device and the video conference provider may traverse a multitude of ASs. In some examples, the network traffic can include unified communications (UC) data including data from various communication methods including voice, video conferencing, instant messaging, email, application or desktop sharing, and other forms of digital communication.

During the course of the video conference, the video conference provider receives large numbers of packets from the first client device in quantities amenable to statistical analysis for the determination of network performance metrics. The packets from the first client device traverse the first AS enroute to the video conference, and may also traverse one or more additional ASs, each AS administered by a CSP. In some examples, packets may also be generated by video conferencing room hardware, including a client device, or synthetic network tests (e.g., a connectivity test tool) generated by a client device, each connected to an AS. The packets from all client device sources may include telemetry information about the video conference.

The video conference provider determines, from the packets received from the first client device, information including first telemetry information about the video conference, the first AS, and the first CSP that administers the first AS. In some examples, the first AS can be determined by applying native geolocation to the IP address of the first client device and determining a region associated with first client device. For instance, native geolocation can be performed using a third-party IP geolocation application programming interface (API), thereby allowing location to be inferred without sharing of any personally identifiable information (PII). Such APIs can infer location from an IP address along with IP registrar ownership records.

For example, one or more packets of the packets received from the client device may include an accessible (e.g., decryptable by the video conference provider) portion that includes telemetry information about the video conference. The telemetry information, localized to the first AS, can be the basis of determining various aggregate network performance metrics relating to the video conference network traffic that traverses the first AS. In some examples, the information received from the first client device may be anonymized to protect the privacy and security of the video conference participants.

The video conference provider then stores the information previously determined. In some examples, the information may be stored using a large, scalable storage repository that can store raw (e.g., unformatted or unprocessed) data like a data lake. The stored information can be associated with various entities in order to be readily accessible by query for later analysis. For example, the information may be stored in association with the first CSP by using, for example, an index or identifier that associates the stored information with the first CSP.

The video conference provider determines, based on the stored information, one or more metrics about the performance of the video conference in the first AS. For example, the video conference provider may query the data lake using a query including a filter for selecting information associated with the first CSP. The returned information associated with the first CSP can be processed to determine network performance metrics including packet loss, latency, jitter, bandwidth utilization, session type, event type, average video resolution, average frame rate, average connection time, or session disconnects. The network performance metrics may be determined over various periods of time. For instance, metrics may be determined over previous numbers of minutes, hours, days, weeks, months, years, and so on.

The video conference then outputs in real-time the one or more metrics about the performance of the video conference in the first autonomous system to the first communication service provider. For example, the data lake can be continuously queried, and metrics can be determined on an ongoing or rolling basis, resulting in the availability of real-time or near-real-time metrics. The real-time metrics can be provided for output using, for example, web-based API. In another example, real-time network quality telemetry can also be provided to the CSP using web-based streaming methods including webhooks and Web Sockets. In yet another example, the real-time metrics may be provided in a graphical presentation like a chart or graph using web dashboard. In some examples, real-time metrics may be compared against historical metrics to determine trends in network performance. The video conference provider may also provide periodic reporting to CSPs and other organizations in addition to a variety of services related to network forecasting, troubleshooting, optimization, and improvement.

For example, the metrics can be used for proactive optimization of the AS network for video conferencing. For instance, network segments exhibiting signs of significant network congestion or high latency in the AS can be identified and used to suggest or implement routing changes. The CSP can adopt the proposed alterations to reduce latency, decrease packet loss, and improve user experience. In some examples, the real-time metrics can be used for automated issue resolution. For example, the video conference provider may be configured to automatically recommend specific remedial actions to the CSPs based on the real-time metrics. For example, if latency exceeds a certain threshold, the video conference provider can recommend that network traffic be rerouted through a different path, or if a distributed denial of service (DDoS) attack is detected, it can recommend certain additional security protocols to mitigate the attack. In another example, the video conference provider can use a web API provided by the CSP to automatically create bug reports or file tickets in an issue reporting system upon the detection of network performance issues.

In another example, the real-time metrics can be provided as input to machine learning (ML) models to identify anomalies in network performance, which may indicate potential issues such as DDoS attacks, equipment failure, or inefficient routing policies. The real-time metrics coupled with historical data can be used to further train the ML models to recognize the anomalies and forecast impending network issues before they affect the video conferencing experience. For instance, the real-time metrics and historical trend information can be used for predictive analytics to forecast future network conditions. Predictive models can be to provide insights into potential network performance issues or predicted spikes in network traffic that may adversely affect video conferencing user experience. In some examples, real-time metrics and observed network trends can be continuously fed back into the ML models (e.g., online training). The feedback can be used to refine and improve the ML models used for network optimization, anomaly detection, predictive analytics, and automated issue resolution.

The innovations of the present disclosure provide significant improvements in the field of monitoring video conferencing quality-of-service in autonomous systems. CSPs may lack the ability to determine the health and performance of real-time UC traffic across their networks. Troubleshooting networks may be performed reactively and without reference to a network baseline that reflects a healthy network for effective real-time communications traffic, in particular traffic associated with high-resolution video conferencing, real-time application and desktop sharing, and other high-bandwidth demands. A CSP administering an AS may be frustrated by the inability to see beyond the source and destination of encrypted AS network traffic. That inability cascades forward in time, because CSPs cannot determine trends associated with video conferencing traffic with sufficient resolution to plan for future network buildouts and upgrades. Thus, prior to the innovations of the present disclosure, CSPs were hampered by an inability to effectively monitor network traffic or to resolve customer support issues in a timely manner for which they may nevertheless be held accountable for by its users.

With the techniques disclosed herein, a service hosted by the video conference provider can allow CSPs to view AS traffic patterns and remediate performance issues in their respective administered ASs. A video conference provider using the techniques can receive telemetry data from client devices, video conferencing room hardware, and synthetic network tests, among other sources, which can be coupled with inferences about network topology and IP address-based geolocation to generate precision real-time metrics that are not otherwise available to CSPs.

For instance, a CSP may be unable to determine, on the basis of encrypted network traffic, the nature of the underlying communication (e.g., session type or video conference type) and details about the effectiveness of such communications, such as the actual video resolution and frame rate seen by end users, communication durations, session disconnects experienced during communications due to network errors or failures, and so on. Moreover, without such data, CSPs cannot measure, estimate, or predict network trends, whether in the short- or long-term.

With the techniques disclosed herein, CSPs can receive real-time, aggregated, trending, and predicted future metrics that can reduce troubleshooting and response time. Moreover, metric trends and predicted future metrics can allow CSPs to plan for periodic, recurring network outages as well as to intelligently plan future network upgrades and buildouts according to trending video conferencing metrics. The techniques can further allow CSPs to "drill down" to explore video conferencing and UC metrics and trends at both low and high levels of granularity. Thus, a CSP may be able to use the techniques to troubleshoot a network failure for groups of users (e.g., an organization), geographically/regionally related users, or all users of a network, according to the measured scale of the issue.

These illustrative examples are given to introduce the reader to the general subject matter discussed herein and the disclosure is not limited to these examples. The following sections describe various additional non-limiting techniques for video conferencing quality-of-service in autonomous systems.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
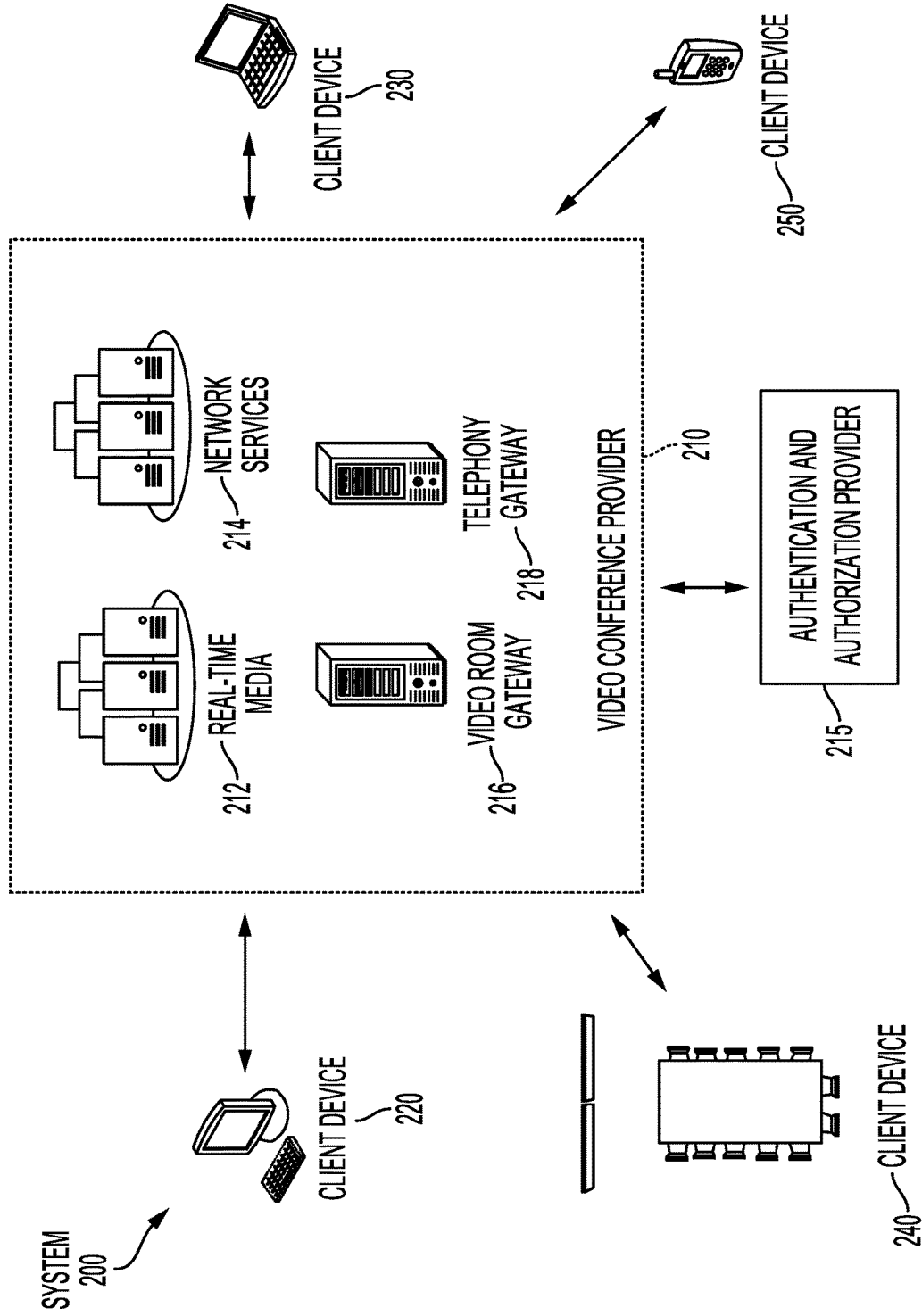
FIG. 2 shows an example system in which a video conference provider provides videoconferencing functionality to various client devices, according to some aspects of the present disclosure.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client devices 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some embodiments, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
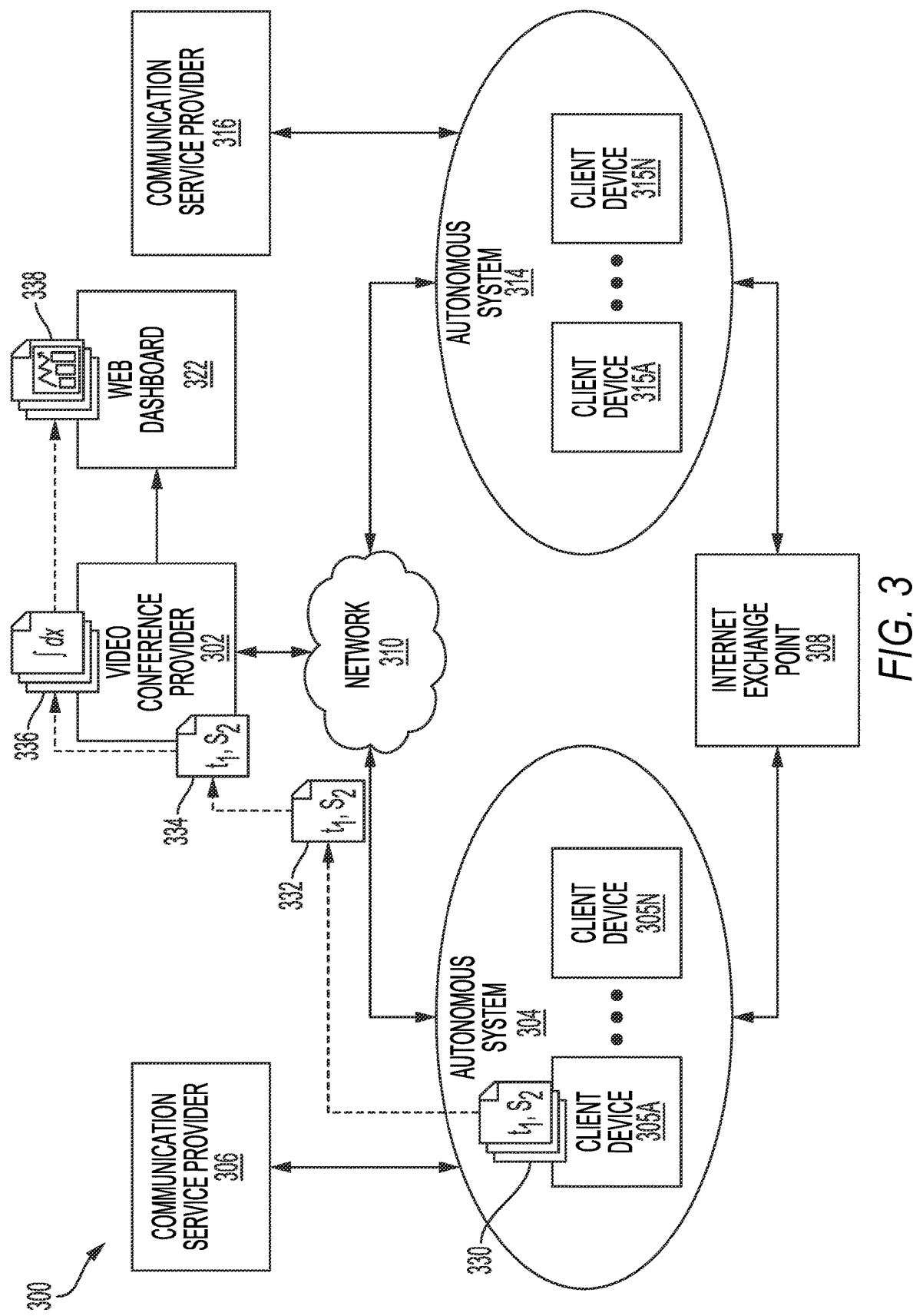
FIG. 3 shows an example of a system for monitoring video conferencing quality-of-service in autonomous systems, according to some aspects of the present disclosure.

Referring now to FIG. 3, FIG. 3 shows an example of a system 300 for monitoring video conferencing quality-of-service in autonomous systems, according to some aspects of the present disclosure. In system 300, a number of client devices are connected to video conference provider 302 across network 310. The network 310 may be the Internet but can also include any public network, private network, or any other suitable combination of networked devices. For example, network 310 may include public networks such as regional communication service providers (CSPs) or public wireless access points, private networks including home networks, corporate intranets, or proprietary data networks. Network 310 may also include components making up the low-level infrastructure of the Internet such as backbone network connections, local edge networks, specialized routing systems like Content Delivery Networks (CDNs), specialized subnets, or autonomous systems (ASs) 304, 314.

ASs 304, 314 may include cohesive collections of IP networks and routers under the control of a single network operator, like CSPs 306 and 316, respectively. The IP networks and routers making up an AS may share a common routing policy. The common routing policy may include rules or criteria that govern how routers within the AS handle incoming and outgoing network traffic. The common routing policy is typically implemented using routing protocols like Border Gateway Protocol (BGP) for inter-AS routing, and protocols like Open Shortest Path First (OSPF) or Intermediate System to Intermediate System (IS-IS) for intra-AS routing. AS boundaries may be defined logically and organizationally, rather than geographically, enabling an AS to span multiple geographically disparate locations. Internet Exchange Point (IXP) 308 can include physical infrastructure at which two or more ASs exchange network traffic. IXP 308 can reduce network latency and costs by avoiding transits through intermediary networks.

ASs 304 and 314 include a multitude of client devices communicatively coupled to the network 310. For example, AS 304 includes client devices 305A . . . 305N and AS 314 includes client devices 315A . . . 315N. A client device such as client device 305A may be a personal computer, laptop, smartphone, tablet, or similar device. Client device 305A may be connected to the network 310 from within AS 304. For example, CSP 306 may provide network services to a region, building, organization, etc. that includes client device 305A. The network services provided by CSP 306 may include network connectivity to network 310 via AS 304. Thus, client device 305A is a part of an IP network making up AS 304.

Client device 305A may connect to a remote server or servers such as video conference provider 302 or other computing devices outside AS 304. The network request may first traverse local network devices, like local switches, routers, Wi-Fi routers, and so on. The local network devices connect to network infrastructure of CSP 306, using, for example a Digital Subscriber Line (DSL) connection or a cable modem. The request may be routed within the within the AS 304, which uses interior gateway protocols (IGPs) like OSPF or IS-IS to identify the best route for the packet within the AS 304. The request may then reach the border of the AS 304 at a BGP router. The BGP router, at the edge of the AS, may apply routing policies and use a routing table to choose a path through network 310 towards the destination AS, to which the video conference provider 302 or another remote server is connected. In some examples, the request may be forwarded directly to an adjacent AS 314 that is connected to AS 304 via IXP 308.

In example system 300, the video conference provider 302 hosts a video conference with one or more participating client devices client devices 305A . . . 305N and 315A . . . 315N. The video conference may generate a large amount of network traffic between the client devices 305A . . . 305N and 315A . . . 315N and the video conference provider 302, including IP packets 330 with transport control protocol (TCP) segment or user datagram protocol (UDP) datagram payloads. The IP packets may, for example, include audio and video data making up one or more audio and video streams, respectively, used during the operation of the video conference. The packets 330 may include a variety of other data including textual data, metadata, quality of service (QoS) data, and telemetry information relating to the video conference.

CSP 306 may not be able to access the telemetry information contained in packets 330. For example, packets 330 may be sent across network 310, including AS 304, using an encrypted protocol such as secure socket layers (SSL) or transport layer security (TLS). In that case, CSP 306 may be able to determine a limited subset of the information contained in packets 330 including source and destination IP address. The CSP 306 may be able to determine only highly abstracted aggregate network performance metrics relating to the video conference. For example, using source and destination IP address, the CSP may be able to determine jitter, bandwidth utilization, packet loss, or latency for large numbers of unknown groups of video conference provider 302 in AS 304, over specified periods of time. However, it may not be possible to determine performance metrics with any further granularity such as session type, event type, average video resolution during meetings, average frame rate, average connection time, session disconnects, and so on, or to aggregate metrics at the group, organization, or regional level.

Using the innovations of the present disclosure, the video conference provider 302 can provide granular information to CSPs down to a per-video conference level of granularity. Additionally, the techniques can be used to provide aggregate metrics, include periodic reports for CSPs including information about how network performance maps to UC usage trends, including, for example, heat maps of video conferences, webinar counts, and phone calls and session initiation protocol (SIP) trunk utilization. SIP trunk utilization can refer to a measure of the proportion of SIP trunks in use at a given time, which may be related to a measure of overall network load or capacity.

The telemetry information included in some packets 330 can be used to determine network performance metrics by analyzing data included in IP packet payloads such as packet timestamps, sequence numbers, and payload sizes. Through measurements and analysis of received telemetry information, network performance metrics like latency, jitter, bandwidth utilization, packet loss, and throughput can be derived. The analyzed telemetry information can be provided in real-time via, for example, web API or web dashboard 322 in a suitable output format including charts, graphs, formatted data, notifications, alerts, and so on. In some examples, the packets 330 received by the video conference provider 302 may include information about the multimedia router (MMR) closest to the client device 305A that can be used to infer underlying network and geographic topology. For example, the information about the MMR may include a selection of MMR resources that are associated with a particular location, country, or region, which can be used to correlate the received network traffic with a CSP's network. In some examples, some network devices included in AS 304 may use a quality of service streaming API hosted by video conference provider 302 to send network information to video conference provider 302 that can provide additional telemetry information, routing data, and network performance information for the determination of network performance metrics.

For example, client device 305A may send IP packets 330 including video conference information to video conference provider 302 over network 310. The packets 330 may include telemetry information such as timestamps or sequence numbers (schematically represented in FIG. 3 as $t_1$ and $s_2$). At 332, the packets 330 leave AS 304 at an edge router and traverse network 310. At 334, the packets 330 are received by video conference provider 302 where they may be stored in a data lake. At 336, the packets undergo transformation or analysis and are provided to CSP 306 using web dashboard 322 or other suitable output technology.

Figure 4:
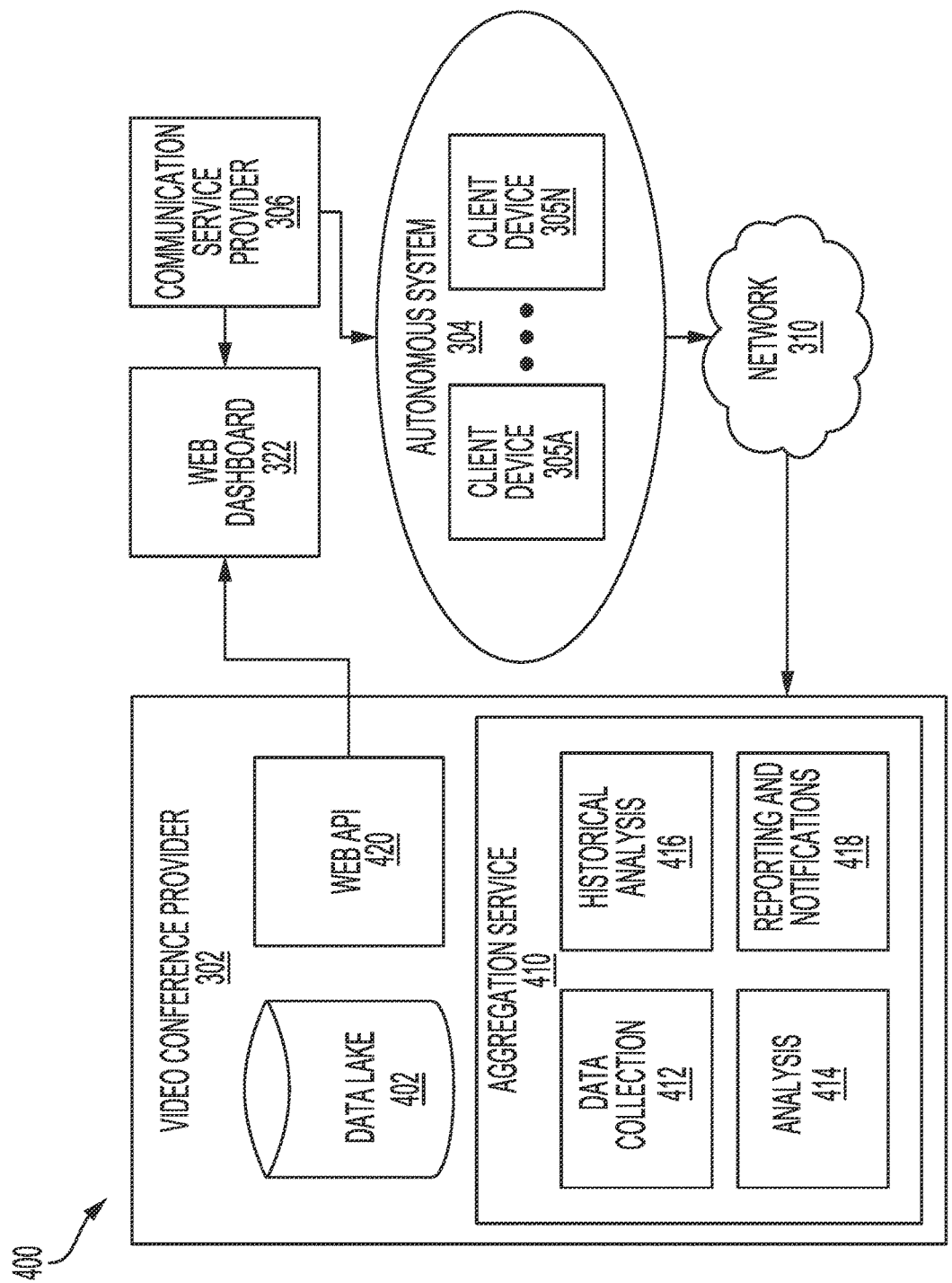
FIG. 4 shows an example of a system for monitoring video conferencing quality-of-service in autonomous systems, according to some aspects of the present disclosure.

Referring now to FIG. 4, FIG. 4 shows an example of a system 400 for monitoring video conferencing quality-of-service in autonomous systems, according to some aspects of the present disclosure. System 400 includes video conference provider 302. Some examples of video conference provider 302 may be similar to video conference provider 110 and video conference provider 210 of FIGS. 1 and 2, respectively.

Video conference provider 302 may be a standalone computing device (e.g., a physical server or servers), a cloud computing device, or a combination of physical hardware and cloud-based resources. Although video conference provider 302 is depicted in system 400 as including several components, in some examples, one or more of these components may be hosted externally to video conference provider 302. For instance, in some examples data lake 402 may be hosted by a cloud storage provider and accessed by video conference provider 302 using a suitable API or other tools.

System 400 includes client devices 305A . . . 305N connected to network 310 via AS 304, as discussed in FIG. 3 and the accompanying description. AS 304 is administered by CSP 306. Client devices 305A . . . 305N may be participants in a video conference hosted by video conference provider 302. The associated network traffic may traverse AS 304 in addition to other ASs enroute to and from the client devices 305A . . . 305N. CSP 306 may have limited insight into the content of the network traffic between client devices 305A . . . 305N and video conference provider 302, while yet still acting as a point of contact for troubleshooting of related network failures or outages.

For instance, client device 305A may experience slow or laggy video performance during a video conference and may report the issue to CSP 306. Without the innovations of the present disclosure, CSP 306 may be unable to identify, localize, or troubleshoot the issue. Using the innovations disclosed herein, CSP 306 can use web dashboard 322 provided by video conference provider 302 to obtain real-time, granular network performance information about the video conferencing network traffic that traverses AS 304.

Video conference provider includes aggregation service 410. In general, aggregation service 410 includes components for ingesting, securing, and analyzing network information related to video conferencing. After the network information has been analyzed, aggregation service 410 may include components for generating reports, such as visualizations, as well as notifications and alerts.

Aggregation service 410 includes a component for data collection 412. Data collection 412 includes tools and methods for the ingestion of network performance data. For example, the network performance data may include telemetry encapsulated within IP packets used during video conferences such as packet sequence numbers, timestamps, source and destination IP addresses, round-trip times, packet sizes, and so on. The telemetry may also include information about the particular associated video conference including, for example, information about the type of payload (e.g., audio stream data or video stream data) or about different video quality levels or codecs. Additionally, the telemetry may include video conference information including frame rate, resolution, bitrates, and other related video conference information.

Network traffic and performance information may be received by video conference provider 302 and provided to the data collection 412 component of aggregation service 404 using a stream processing framework, a batch processing framework, a message-based framework, direct ingestion, or other suitable method. Ingested data can be stored in data lake 402, discussed below. In some examples, ingested data may be stored in a "raw," unstructured format to maximize the efficiency of the ingestion process.

For example, a UDP segment used in a video conference may include a portion that is encrypted and only readable by the video conference participants at the endpoints of the transmission (e.g., end-to-end encryption). In a system using end-to-end encryption, only the communicating users can read the underlying data, which are encrypted and decrypted with private keys that are only accessible to the sender and the recipient. Such a configuration prevents intermediaries, like video conference provider 302 and CSP 306, from accessing the encrypted data. The UDP datagrams may also include an unencrypted portion that includes telemetry information that can be read by video conference provider 302. Importantly, such telemetry information is still not be readable by CSP 306 due to additional layers of encryption like SSL, TLS, Datagram Transport Layer Security (DTLS), Internet Protocol Security (IPsec), and so on.

In some examples, data collection 412 component can anonymize information received from client devices 305A . . . 305N. For example, the telemetry information contained in payload portions that are not end-to-end encrypted may still contain information that can be used to identify or localize users or groups of users. The metrics, reporting, and visualizations provided by the video conference provider 302 are stripped of all identifying and/or localizing information. In addition, explicit user consent may still be required to provide the telemetry to either the video conference provider 302 or to the CSP 306. For instance, the source IP address may be used to geolocate a packet to a particular region or CSP 306, but may not be included in the metrics, reporting, and visualizations provided to the CSP 306. A non-limiting list of information that may be deleted from ingested telemetry to prevent identification or localization includes timestamp or time zone, device information or fingerprint, network details, or user information of any type.

Aggregation service 410 also includes a component for analysis 414. Analysis 414 component is used for the determination of network performance metrics at various levels of abstraction and aggregation based on data stored in data lake 402, among other locations. In some examples, analysis 414 component may store calculated metrics in a memory device, including a database or memory-based cache for use by the reporting and notifications 418 component describe below.

In some examples, analysis 414 component can determine metrics "just-in-time" (JIT). JIT determination of metrics may refer to a processing approach in which the analysis 414 component calculates metrics when they are requested (e.g., via query at web API 420) at the time they are needed, as opposed to pre-calculating and storing them. In some cases, such queries or determinations may be triggered by the receipt of new data or other specific event. For example, the analysis 414 component may calculate the average video conference length at the conclusion of each video conference. Analysis 414 may store metrics calculated using the JIT paradigm using ephemeral storage like an in-memory cache. For instance, a JIT determination of metrics may be initiated by a graph query language (GraphQL) query and that specifies key performance indicators that are unique to each CSP.

Analysis 414 component can query the data lake 402 for unstructured video conference information using a filter that requests data only for CSP 306. In some examples, the query may be further limited or filtered by time, geographic region, video conference type, and so on, according to the particular metric being determined. In some examples, data is retrieved from data lake 402 using "big data" processing techniques such as structured query language (SQL)-based database clients, MapReduce, batch and real-time analytics and data processing software, or cloud storage provider data warehousing solutions.

Data returned from data lake 402 can be preprocessed and transformed into a suitable format for determination of metrics. Preprocessing and transformation may include operations such as cleaning (e.g., data hygiene), anonymization, normalization, and feature extraction. The processed data may be used by analytical models or algorithms to calculate metrics. Metrics may include trend analyses, statistical summaries, or predictive modeling outcomes. For example, calculated metrics may include metrics including packet loss, latency, jitter, session type statistics, event type statistics, average video resolution, average frame rate, average connection time, or session disconnects statistics, among many other possible examples.

Analysis 414 component may include one or more ML models. For example, the ML models can be used to determine trends given data returned from data lake 402 queries. The ML models can include models trained using suitable supervised, semi-supervised, or unsupervised training techniques. For example, a neural network could be trained using supervised training methods, including training data consisting of labeled inputs and corresponding outputs, to learn underlying patterns and relationships in video conference network traffic, thus enabling functions such as prediction and classification for new, unseen examples. Likewise, unsupervised training data drawn from unlabeled examples from data lake 402 to identifying hidden structures or patterns through using techniques such as clustering or dimensionality reduction, thereby surfacing trends and insights from the otherwise unstructured and disparate datasets.

Any suitable machine learning model may be used according to different examples, such as linear regression, logistic regression, decision trees, random forests, gradient boosting machines (GBM), support vector machines (SVM), naive bayes, k-nearest neighbors (KNN), neural networks, convolutional neural networks (CNN), recurrent neural networks (RNN), long short-term memory (LSTM), XGBoost, AdaBoost, and gaussian processes. Further, some examples may employ adversarial networks, such as generative adversarial networks (GANs) while others may employ autoencoders (AEs). Several variations among AEs may be found, including variational AEs (VAEs) or conditional VAEs (CVAEs). GANs and AEs may be used in conjunction in configurations such as AEGANs or variational AEGANs (VAEGANs).

In some examples, analysis 414 component can use network information obtained from video conference IP packets to surface a reverse path trace, also known as a reverse traceroute or "My Traceroute" (MTR), from the video conference provider 302 network into the CSP 316 network (e.g., AS 306). A reverse path trace can be a technique to determine the route a packet took from the source network to the destination network.

Aggregation service 410 also includes a component for historical analysis 416. Historical analysis 416 component can use stored historical data, such as trends and patterns previously identified, to augment the determinations of the analysis 414 component. For example, historical analysis 416 component can generate comparisons between past and present trends, identify recurring patterns, or anomalies, and generate more reliable predictions about future network traffic patterns. For instance, the historical analysis 416 component could use past seasonal usage trends and current metrics derived from real-time network performance information to predict future bandwidth demands in an AS or IP block and highlight any anomalies or shifts in usage patterns. CSPs can use the determinations of historical analysis 416 component for future upgrades or build-out planning. In some examples, historical analysis 416 component may store calculated historical trends and comparisons in a memory device, including a database or memory-based cache for use by the reporting and notifications 418 component described below.

In some examples, analysis 414 component can use the determined metrics and historical metric trends to identify potential network problems. To ascertain potential network problems, the analysis 414 component may employ a variety of statistical and ML techniques. In some examples, analysis 414 component can calculate moving averages or use exponential smoothing to spot trends, deviations, or anomalies in the time-series data of these metrics. Regression analysis may be employed to predict future values based on past trends.

For example, analysis 414 component may observe a continuous increase in network latency across multiple routers over a specified period. If the latency crosses a certain predefined threshold, analysis 414 component may classify this as an anomaly, indicative of a potential network problem such as network congestion. The historical analysis 416 component can utilize historical metric trends for establishing baselines for normal network behavior. The baselines can be compared with real-time metrics to determine deviations that can be indicative of issues such as equipment failure or DDoS attacks. Potential network problems can be sent to reporting and notifications 418, discussed below, to cause logging, alerts, or notifications that enable network administrators to respond.

Aggregation service 410 also includes a component for reporting and notifications 418. Reporting and notifications 418 may be used for generation of structured data for output via web API 420, reports, visualizations, notifications, or other data formats for the conveyance of network performance information and metrics. Metrics and other measurements determined by analysis 414 or historical analysis 416 components can be accessed from a memory device like a database or in-memory cache in which the metrics and other measurements were stored.

Reporting may include generating structured aggregate network performance data that can be exposed using web API 420. For example, web API 420 may receive a query for a particular metric from client device 305A (e.g., an HTTP GET request). Reporting and notifications 418 may in turn query the memory device used for storage of calculated metrics. In some examples, reporting and notifications 418 can query data lake 402 directly. Reporting and notifications 418 can generate an appropriate data structure, like a JavaScript object notation (JSON) object or extensible markup language (XML) object and populate it with the results of the query. The generated data structure can be returned as a response to the query received at web API 420.

Reporting and notifications 418 may include generation of executive-level summary reports. Such reports may include example metrics such as average mean opinion scoring (MOS) for all users. MOS, in the context of video conferencing, can be a standardized measure of the overall quality and user satisfaction with the audio and visual components of the communication experience. For example, at the conclusion of a video conference, the video conference software may provide the user of client device 305A a UI element soliciting a rating of the quality of the video conference. The answers to such questions form the basis of an MOS calculation and may be included in, for example, the telemetry data returned to video conference provider 302 by client device 305A. Executive-level summary reports may also include lists of high- or low-performing areas of network performance (e.g., geographic regions, connection type, user demographics, etc.).

Reporting and notifications 418 may include generation of network operations center (NOC)-level reporting. A NOC may be a central location from which network administrators supervise, monitor, and maintain the network owned by the CSP 316. For example, NOC-level reporting may include the gathering, analysis, and presentation of network performance data and metrics, carried out by a centralized NOC, to ensure continuous network monitoring, troubleshoot issues, and optimize network performance in real time. For example, the NOC-level may include reports including identification of potential network problems with fine-grained resolution at the network level, session border controller trends, session border controller activations, average audio call MOS, average video call MOS, average round trip time (RTT), average jitter, and so on.

Reporting and notifications 418 may further include annual reporting for the CSP 316. For example, annual reporting may include average performance as compared with other CSPs, number of total audio or video calls that included network traffic traversing AS 304 (e.g., traffic crossing CSP 316 session border controllers), or the NOC-level reporting discussed previously.

In some examples, reporting and notifications 418 may include components for facilitating the submission of telemetry directly to the CSPs on behalf of video conference participants. For example, a participant may experience an adverse network event during a video conference. The video conferencing client software may present UI controls for submitting a problem report under when the adverse network conditions are detected (e.g., a UI widget labeled "Submit a Problem" with suitable text input boxes). The telemetry information could then be provided by the participant to the CSP via the video conference provider 302, given explicit client for the sharing of identifiable data. In some examples, the submitted telemetry information may be formatted as a JSON object and provided directly to the CSP using, for example, webhooks or a Web Sockets connection. In that case, the video conference provider 302 may authenticate to the CSP 306 on behalf of the video conference participant.

The video conference provider 302 includes web API 420. For example, web API can receive queries from client device 305A. Web API 320 may be implemented using various technologies including simple object access protocol (SOAP), a protocol using XML for data exchange; representational state transfer (REST), which uses standard HTTP methods; graph query language (GraphQL), which allows clients to specify data needs; remote procedure calls (RPCs) like JSON-RPC and XML-RPC; Web Sockets, which can provide real-time bidirectional communication; or other suitable protocols.

Data obtained via query to web API 420 may be used to populate charts and visualizations hosted at web dashboard 322. Web dashboard 322 may be hosted by video conference provider 302 or may be a standalone or third-party service, obtaining data from web API 420. An example of a visualization that may be shown using web dashboard is given in FIG. 5 and the accompanying description.

Access to web dashboard 322 may be provided to CSP 306 using Resource Public Key Infrastructure (RPKI) and BGP AS owner accounts for web dashboard login. RPKI authentication is based on validation of digital certificates associated with AS ownership. Authentication may be performed by the CSP, or the owner of the AS number, by presenting valid, signed digital certificates to the RPKI at login. The certificates can be checked for a valid signature from a trusted Certificate Authority (CA) and that the certificate has not been revoked or expired. The certificate may also contains information about the CSP's AS number, which must match the AS number the CSP claims to own.

Video conference provider includes data lake 402. Data lake 402 may be a large-scale (e.g., petabyte-level) data storage repository that can store structured, semi-structured, and unstructured data in its native format. Data lake 402 may be implemented on, for instance, a cluster of commodity hardware or using a cloud storage provider. Access to data lake 402 can be provided through various data processing, database management, and stream or batch processing tools. For example, stream processing tools may be used to ingest large volumes of video conferencing information associated with video conferencing network traffic. Database management tools or clients can then be used for data analysis using statistical analysis frameworks or ML models.

Figure 5:
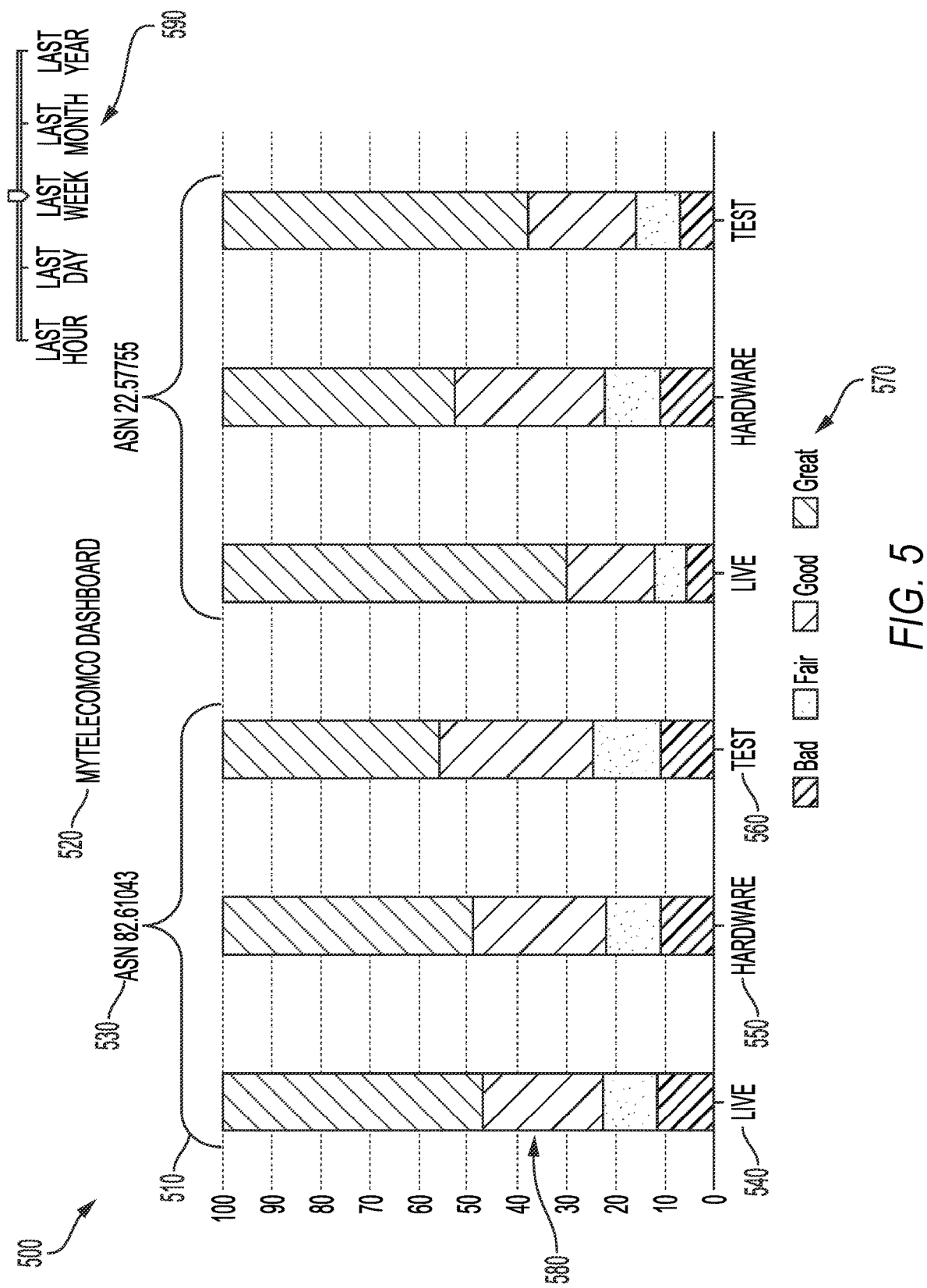
FIG. 5 shows an illustration of a graphical user interface used in some examples of monitoring video conferencing quality-of-service in autonomous systems, according to some aspects of the present disclosure.

FIG. 5 shows an illustration of a graphical user interface (GUI) 500 used in some examples of monitoring video conferencing quality-of-service in autonomous systems, according to some aspects of the present disclosure. GUI 500 may be generated by web dashboard 322 for display to the CSP 306, identified with CSP label 520. The illustration in this figure is a simple example of many possible visualizations that can be based on monitoring video conferencing quality-of-service in autonomous systems. For example, visualizations may include heat maps of network quality by IP block or by AS, line graphs showing measures of delay, jitter, bandwidth utilization, packet loss, or a scatter plot showing actual Round Trip Time (RTT) from clients to multimedia routers (MMRs), among others.

For example, GUI 500 includes a chart 510. Chart 510 is generated for the CSP identified by label 520, which may be CSP 306. Chart 510 shows an example visualization for CSP 306 with two ASs. The ASs may be identified using an AS number (ASN) as shown in ASN label 530. ASN label 530 depicts an ASN represented using the "asdot+" representation method, in which the ASN is shown as two 16-bit low- and high-order values, separated by a dot. Other representations including 16- and 32-bit integers, or the asplain representation are also possible.

Chart 510 depicts aggregated network performance data for two ASs, including aggregate network performance data as measured using at least three sources: live video conferences 540, video conferencing room hardware 550, and synthetic client device tests 560. The aggregate measure is illustrated in legend 570, in which network performance is broadly characterized as bad, fair, good, or great. For example, in a simple example, bad network performance may be defined by greater than 20% of packets lost over a 1 week period of time. The duration represented by the visualization shown in chart 510 may be selected using, for example, slider 590. However, other GUI controls are also possible. One of skill in the art will recognize that, in practice, aggregate network performance may be defined using a variety metrics in various combinations.

FIG. 6 shows a flowchart of an example method for monitoring video conferencing quality-of-service in autonomous systems, according to some aspects of the present disclosure. The description of the method 600 in FIG. 6 will be made with reference to FIGS. 3-5, however any suitable system according to this disclosure may be used, such as the example systems 100 and 200, shown in FIGS. 1 and 2.

It should be appreciated that method 600 provides a particular method for monitoring video conferencing quality-of-service in autonomous systems. Other sequences of operations may also be performed according to alternative examples. For example, alternative examples of the present disclosure may perform the steps outlined above in a different order. Moreover, the individual operations illustrated by method 600 may include multiple sub-operations that may be performed in various sequences as appropriate to the individual operation. Furthermore, additional operations may be added or removed depending on the particular applications. Further, the operations described in method 600 may be performed by different devices. For example, the description is given from the perspective of the video conference provider 302 but the steps of method 600 could be applied equally from the perspective of other components, like a monitoring system hosted by a cloud services provider. One of ordinary skill in the art will recognize many variations, modifications, and alternatives.

At block 602, the video conference provider 302 establishes a video conference including a plurality of client devices, each client device connected to an autonomous system of a plurality of autonomous systems. For example, one or more client devices 305A . . . 305N that are connected to AS 304 may send an indication to join a particular video conference to video conference provider 302 over network 310. Client devices 305A . . . 305N may include a GUI that provides controls for specifying and joining video conferences. Likewise, client devices 315A . . . 315N, connected to AS 314, may send indications to join the same video conference.

Network traffic relating to the video conference may traverse AS 304, AS 314, other ASs included in network 310, between ASs via, for example, IXP 308, or other network routes. Each AS is administered by a CSP. For example, AS 304 is administered by CSP 306 and AS 314 is administered by CSP 316. While CSPs can determine the source and destination IP addresses of network traffic relating to video conferences, specific information about the video conference, even in aggregate, may not be possible to determine due to network traffic utilizing end-to-end encryption or transport layer security (e.g., SSL or TLS).

At block 604, the video conference provider 302 joins a first client device to the video conference, the first client device connected to a first AS 304 administered by a first communication service provider. As in block 602, a first client device 305A of the plurality of client devices sends an indication to join the video conference. Client device 305A may be a laptop, desktop, smartphone, etc. connected to a residential or corporate network that is an IP network that is a part of first AS 304. First AS 304 is administered by first CSP 306.

At block 606, the video conference provider 302 receives one or more packets from the first client device. During the video conference, the participating client devices 305A . . . 305N, 315A . . . 315N may send a large volume of network traffic to the video conference provider 302. The video conference provider receives video conference-related network traffic from client devices and relays it to the other client devices participating in the video conference. The network traffic is sent over IP networks using packets that identify a source and destination IP address that are used to route the packets throughout ASs and the IP networks contained therein. The packets may be routed between ASs in accordance with Internet routing protocols including, for example, the BGP.

The IP packets may include an encapsulated payload like a TCP segment or UDP datagram. The encapsulated payload may include data such as video stream data, audio stream data, telemetry information relating to the video conference, profile data, and so on. In some examples, the video conference provider 302 receives IP packets via network 310 from first client device 305A. The packets may contain a portion that is end-to-end encrypted, and therefore cannot be decrypted by the video conference provider 302 or CSP 306. The packets may also contain a portion that is not end-to-end encrypted but is still protected by transport layer security like TLS, SSL, or DTLS. Thus, in some cases were the video conference provider 302 is the endpoint of an IP route, the video conference provider can read the unencrypted portion. For instance, telemetry information about the video conference may be included in the unencrypted portion. In some examples, client devices must affirmatively opt-in to or otherwise provide explicit authorization for the sending of telemetry information to the video conference provider.

At block 608, the video conference provider 302 determines, from the one or more packets from the first client device 305A, first client device information, comprising first telemetry information about the video conference; the first AS 304 traversed by the one or more packets from the first client device 305A; and the first CSP 306 that administers the first autonomous system. For example, the packets may include a TCP or UDP payload that include telemetry information about the video conference.

A simple example of telemetry information that may be included using a structured data format like JSON is:

```
{
  "details": {
    "title": "The user's QOS summary details.",
    "type": "object",
    "properties": {
      "min_bitrate": {
        "type": "string",
        "description": "The minimum amount of bitrate, in Kbps.",
        "example": "27.15 Kbps"
      },
      "avg_bitrate": {
        "type": "string",
        "description": "The average amount of bitrate, in Kbps.",
        "example": "27.15 Kbps"
      },
      "max_bitrate": {
        "type": "string",
        "description": "The maximum amount of bitrate, in Kbps.",
        "example": "27.15 Kbps"
      },
      "min_latency": {
        "type": "string",
        "description": "The minimum amount of latency, in milliseconds.",
        "example": "126 ms"
      },
      "avg_latency": {
        "type": "string",
        "description": "The average amount of latency, in milliseconds.",
        "example": "126 ms"
      },
      "max_latency": {
        "type": "string",
        "description": "The maximum amount of latency, in milliseconds.",
        "example": "126 ms"
      },
      "min_jitter": {
        "type": "string",
        "description": "The minimum amount of jitter, in milliseconds.",
        "example": "0 ms"
      },
      "avg_jitter": {
        "type": "string",
        "description": "The average amount of jitter, in milliseconds.",
        "example": "0 ms"
      },
      "max_jitter": {
        "type": "string",
        "description": "The maximum amount of jitter, in milliseconds.",
        "example": "0 ms"
      },
      "min_loss": {
        "type": "string",
        "description": "The minimum amount of packet loss. ",
        "example": "0.03%"
      },
      "avg_loss": {
        "type": "string",
        "description": "The average amount of packet loss.",
        "example": "0.03%"
      },
      "max_loss": {
        "type": "string",
        "description": "The maximum amount of packet loss. ",
        "example": "0.4%"
      },
      "resolution": {
        "type": "string",
        "description": "The number of pixels in each dimension that the video camera can display.",
        "example": "1280*720"
      },
      "min_frame_rate": {
        "type": "string",
        "description": "The minimum amount of frame rate, in fps.",
        "example": "12 fps"
      },
      "avg_frame_rate": {
        "type": "string",
        "description": "The average amount of frame rate, in fps.",
        "example": "12 fps"
      },
      "max_frame_rate": {
        "type": "string",
        "description": "The maximum amount of frame rate, in fps.",
        "example": "12 fps"
      },
```

```
"zoom_min_cpu_usage": {
    "type": "string",
    "description": "Zoom's minimum CPU usage.",
    "example": "0%"
},
"zoom_avg_cpu_usage": {
    "type": "string",
    "description": "Zoom's average CPU usage.",
    "example": "0%"
},
"zoom_max_cpu_usage": {
    "type": "string",
    "description": "Zoom's maximum CPU usage.",
    "example": "2%"
},
"system_max_cpu_usage": {
    "type": "string",
    "description": "The system's maximum CPU usage.",
    "example": "11%"
}
            }
        }
    }
}
```

This example includes user QoS information including information about bitrate, latency, jitter, packet loss, resolution, frame rate, and CPU usage. One of ordinary skill in the art will recognize that a large array of additional information may be included in telemetry information in addition to these examples.

In some examples, the first AS 304 can be determined using the source IP address of the packets received from the first client device 305A. The video conference provider 302 can determine, using native geolocation, a region associated with the source IP address. Native geolocation can include determining the geographic location of a client device 305A the source IP address associated with the client device 305A. Native geolocation may use, for example, a database that maps IP addresses to regions. Using the region, the video conference provider 302 may determine the first AS 304. For example, the video conference provider 302 can determine the AS 304 for a particular region using the client's IP address by performing an IP-to-ASN lookup, where the ASN is the AS number. The ASN may assigned to each AS by regional Internet registries. The IP-to-ASN database may map IP addresses to ASNs and include information about the CSP. With this information, the server can infer how the geographic location is connected to the internet. However, geographic information obtained using this procedure is probabilistic in nature due to the inherent variability in IP address allocation and usage. For example, some users may connect to the internet using a virtual private network (VPN) which may lead to the inference of an inaccurate geographic location.

At block 610, the video conference provider 302 stores the first client device information in association with the first communication service provider. For example, the first client device information can be stored in a data lake 402. The first client device information may be structured, semi-structured, or unstructured. Structured data may include data organized according to predefined models, while semi-structured data may not be organized according to a model but may include metadata identifying types of data. Unstructured data may entirely lack a specific format or organization. The first client device information may be ingested into data lake 402 through various methods like batch loading or real-time streaming. The first client device information may be stored in data lake 402 in an unprocessed format, which can be later transformed and analyzed for the determination of network performance metrics. In some examples, the stored first client device information may be associated with the first CSP. For example, the first client device information may be added to a data structure that is indexed or labeled with an identifier of the first CSP.

At block 612, the video conference provider 302 determines, based on the first client device information stored in association with the first communication service provider, one or more metrics about performance of the video conference in the first autonomous system. The data lake 402 can be queried one or more times using data processing or analysis tools, which include features for handling diverse datasets stored in their unstructured format across large, distributed databases. For example, the video conference provider 302 may query the data lake 402 for video conference information for the first CSP 306. In some examples, the query may be further limited or filtered by time, geographic region, video conference type, and so on, according to the particular metric being determined.

The information returned from the data lake 402 queries may be used by analysis 414 component for the determination of network performance metrics at various levels of abstraction and aggregation based on data stored in data lake 402. For example, analysis 414 component may use data from data lake 402 to build anonymized summary reports that are specific to each CSP. In another example, analysis 414 component may correlates network conditions from previous meetings and calls to generate metrics and historical metrics in concert with historical analysis 416 component. In yet another example, analysis 414 component can collect aggregate video conference averages based on AS or public IP block.

At block 614, the video conference provider 302 outputs in real-time the one or more metrics about the performance of the video conference in the first AS 304 to the first CSP 306. CSP 306 can obtain metrics from video conference provider 302 via web API 420 or using metrics dashboard 322. Data, charts, and visualizations may be prepared by the reporting and notifications 418 component. For example, reporting and notifications 418 can generate visualizations that compare JIT-calculate metrics with global or national averages for users in a CSP 306. In another example, reporting and notifications 418 can generate reports that can identify where network segments or regions do not meet minimum quality standards for video or audio conferencing. In yet another example, reporting and notifications 418 may correlate baseline network performance metrics over a rolling window.

Video conference provider 302 can also provide a variety of services to CSP 306 based on the one or more metrics about the performance of the video conference in the first AS 304. For example, video conference provider 302 can provide automated troubleshooting services that can identify potential bottlenecks or problem areas within the AS 304. For instance, if certain metrics continually underperform compared to the global or national averages, the analysis component 414 of video conference provider 302 can pinpoint the specific network segments responsible. Analysis component 414 of video conference provider 302 can apply diagnostic algorithms or initiate an automated troubleshooting sequence to determine possible causes, such as equipment failure, bandwidth exhaustion, or inefficient traffic routing. Identified issues can be relayed to the CSP 306 along with recommended troubleshooting steps.

In another example, video conference provider 302 can provide network segmentation analysis. For example, reporting and notifications 418 can generate an analysis of the performance metrics on a per-segment basis within the network. The segment could be a subnet, a virtual LAN (VLAN), or a particular source/destination path. This analysis may include breakdowns of packet loss rates, latencies, jitter, bandwidth utilization, etc., specific to each segment, which can be used by the CSP 306 to obtain a granular view of network performance and isolate issues more effectively.

In another example, video conference provider 302 can provide demand forecasting. For example, analysis 414 component may include ML models or analytics frameworks for forecasting network demand based on the real-time and historical metrics. Using the analytics frameworks or ML techniques, the analysis 414 component can predict when the demand might exceed capacity or identify periods of likely underutilization. Such forecasting could enable the CSP to manage resources more efficiently and ensure uniform network performance. Similarly, the analysis 414 component can perform long-term trend analysis. The long-term trend analysis can be used to identify patterns of network performance that are dependent on factors such as time of day, day of the week, or specific events, like particular large video conferences, webinars, or other events.

Reporting and notifications 418 can provide various alerting mechanisms. For example, reporting and notifications 418 can generate predictive alerts based on the observed metric trends that related to anticipated deficiencies in quality standards before they occur. Such predictive notifications may enable CSPs to respond to upcoming network performance failures proactively. Likewise, reporting and notifications 418 may generate context-aware alerts or notifications, in which the significance of a given network performance deficiency is evaluated in the context of other contemporaneous network parameters or events, thus avoiding over-notification (e.g., "alert fatigue") to ensure that CSPs can remain focused on the most significant network issues.

Figure 7:
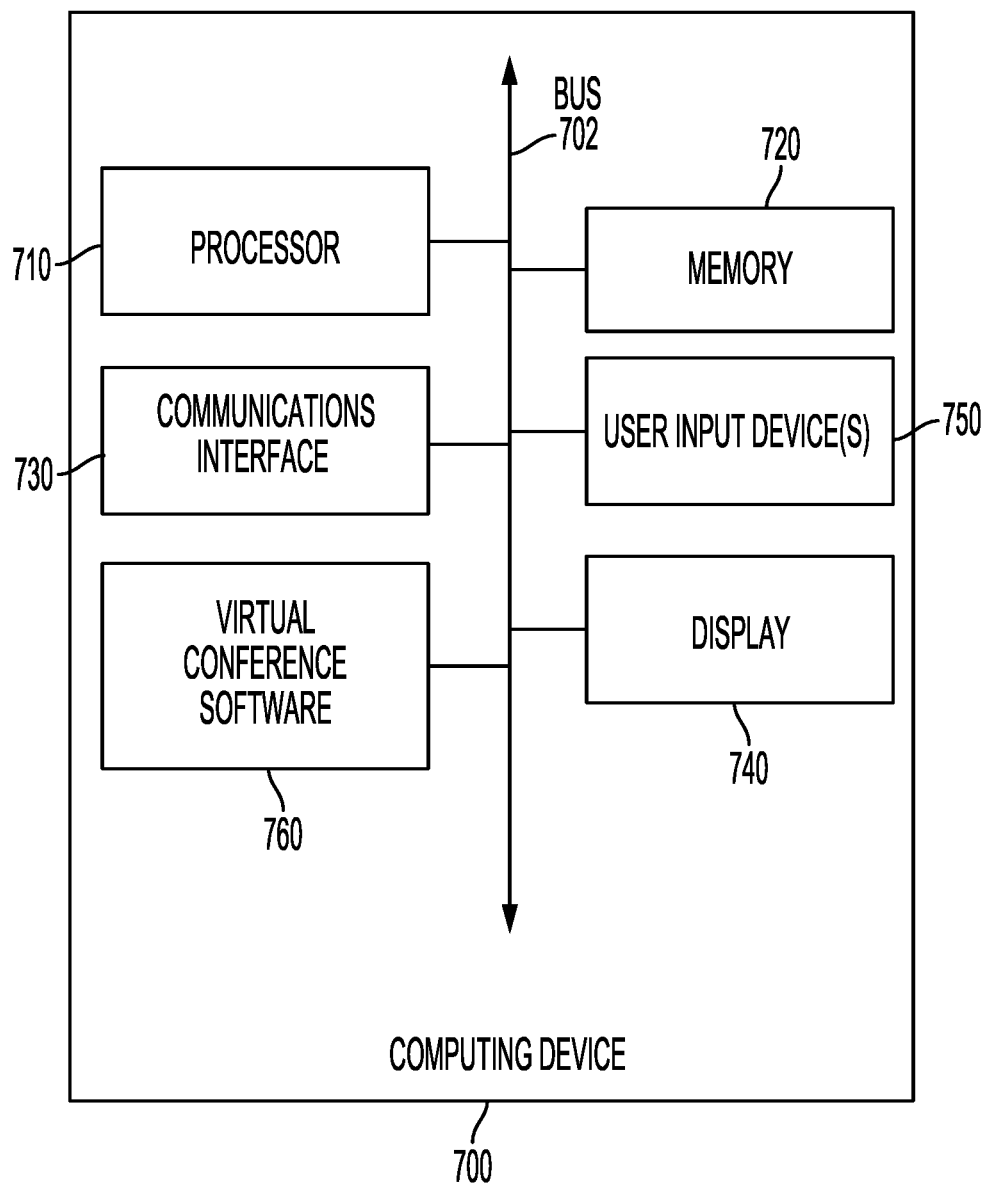
FIG. 7 shows an example computing device suitable for use in some techniques for monitoring video conferencing quality-of-service in autonomous systems, according to some aspects of the present disclosure.

FIG. 7 shows an example computing device suitable for use in some techniques for monitoring video conferencing quality-of-service in autonomous systems, according to some aspects of the present disclosure.

Referring now to FIG. 7, FIG. 7 shows an example computing device 700 suitable for use in example systems or methods for providing video conferencing quality-of-service in autonomous systems according to this disclosure. The example computing device 700 includes a processor 710 which is in communication with the memory 720 and other components of the computing device 700 using one or more communications buses 702. The processor 710 is configured to execute processor-executable instructions stored in the memory 720 to perform one or more methods for monitoring video conferencing quality-of-service in autonomous systems according to different examples, such as part or all of the example method 600 described above with respect to FIG. 6. The computing device 700, in this example, also includes one or more user input devices 750, such as a keyboard, mouse, touchscreen, microphone, etc., to accept user input. The computing device 700 also includes a display 740 to provide visual output to a user.

In addition, the computing device 700 includes virtual conferencing software 760 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a computer-implemented method, comprising: establishing a video conference including a plurality of client devices, each client device connected to an autonomous system of a plurality of autonomous systems; joining a first client device to the video conference, the first client device connected to a first autonomous system administered by a first communication service provider; receiving one or more packets from the first client device; determining, from the one or more packets from the first client device, first client device information, comprising: first telemetry information about the video conference; the first autonomous system traversed by the one or more packets from the first client device; and the first communication service provider that administers the first autonomous system; storing the first client device information in association with the first communication service provider; determining, based on the first client device information stored in association with the first communication service provider, one or more metrics about performance of the video conference in the first autonomous system; and outputting in real-time the one or more metrics about the performance of the video conference in the first autonomous system to the first communication service provider.

Example 2 is the method of example(s) 1, further comprising: joining a second client device to the video conference, the second client device connected to a second autonomous system administered by a second communication service provider; receiving one or more packets from the second client device, wherein the one or more packets from the second client device traverse the first autonomous system and the second autonomous system; determining, from the one or more packets from the second client device, second client device information, comprising: second telemetry information about the video conference; the first autonomous system traversed by the one or more packets; the first communication service provider that administers the first autonomous system; the second autonomous system traversed by the one or more packets; and the second communication service provider that administers the first autonomous system; storing a first portion of the second client device information in association with the first communication service provider; and storing a second portion of the second client device information in association with the second communication service provider.

Example 3 is the method of example(s) 1, further comprising anonymizing the first client device information.

Example 4 is the method of example(s) 1, wherein determining the first autonomous system from the one or more packets comprises: determining, from a packet from the one or more packets, an internet protocol (IP) address of the first client device; using native geolocation, determining a region associated with the IP address; and using the region associated with the IP address, determining the first autonomous system.

Example 5 is the method of example(s) 1, wherein the one or more metrics about the performance of the video conference in the first autonomous system include at least one of: packet loss, latency, jitter, bandwidth utilization, session type, event type, average video resolution, average frame rate, average connection time, or session disconnects.

Example 6 is the method of example(s) 1, wherein: determining, from the first client device information stored in association with the first communication service provider, the one or more metrics about the performance of the video conference in the first autonomous system comprises: querying for information associated with the first communication service provider, wherein the information associated with the first communication service provider includes information about a plurality of packets that traverse the first autonomous system; determining information about network performance in the first autonomous system based on the information about the plurality of packets that traverse the first autonomous system; and determining the one or more metrics about the performance of the video conference in the first autonomous system based on the information about the network performance in the first autonomous system.

Example 7 is the method of example(s) 1, wherein the one or more packets from the first client device comprise at least one of: first packets associated with the video conference; second packets associated with video conferencing room hardware, wherein the video conferencing room hardware includes the first client device; or third packets from a synthetic network test executed on the first client device.

Example 8 is the method of example(s) 1, further comprising: generating, using the first client device information stored in association with the first communication service provider, a reverse path trace from a video conference provider to a location inside the first autonomous system.

Example 9 is the method of example(s) 1, wherein determining, based on the first client device information stored in association with the first communication service provider, the one or more metrics about the performance of the video conference in the first autonomous system comprises: accessing the first client device information stored in association with the first communication service provider, comprising information about a plurality of packets that traversed the first autonomous system; and generating the one or more metrics about the performance of the video conference in the first autonomous system, comprising aggregating the information about the plurality of packets that traversed the first autonomous system.

Example 10 is the method of example(s) 1, wherein outputting in real-time the one or more metrics about the performance of the video conference in the first autonomous system to the first communication service provider comprises: accessing one or more historical metrics associated with each of the one or more metrics about the performance of the video conference in the first autonomous system; and generating a graphic comparing each of the one or more metrics about the performance of the video conference in the first autonomous system with an associated historical metric.

Example 11 is a non-transitory computer-readable medium storing instructions that, when executed by one or more processors, cause the one or more processors to perform a method comprising: receiving one or more packets from a first client device, the first client device connected to a first autonomous system administered by a first communication service provider; determining, from the one or more packets from the first client device, first client device information, comprising: a video conference including the first client device from a plurality of client devices, each client device connected to an autonomous system of a plurality of autonomous systems; first telemetry information about the video conference; the first autonomous system traversed by the one or more packets from the first client device; and the first communication service provider that administers the first autonomous system; storing the first client device information in association with the first communication service provider; determining, based on the first client device information stored in association with the first communication service provider, one or more metrics about performance of the video conference in the first autonomous system; and outputting in real-time the one or more metrics about the performance of the video conference in the first autonomous system to the first communication service provider.

Example 12 is the non-transitory computer-readable medium of example(s) 11, further comprising: receiving one or more packets from a second client device, the second client device connected to a second autonomous system administered by a second communication service provider; determining, from the one or more packets from the second client device, second client device information, comprising: the video conference including the first client device and the second client device from the plurality of client devices; second telemetry information about the video conference; the first autonomous system traversed by the one or more packets from the second client device; the first communication service provider that administers the first autonomous system; the second autonomous system traversed by the one or more packets from the second client device; and the second communication service provider that administers the first autonomous system; storing a first portion of the second client device information in association with the first communication service provider; and storing a second portion of the second client device information in association with the second communication service provider.

Example 13 is the non-transitory computer-readable medium of example(s) 11, further comprising anonymizing the first client device information.

Example 14 is the non-transitory computer-readable medium of example(s) 11, wherein determining the first autonomous system from the one or more packets from the first client device comprises: determining, from a packet from the one or more packets from the first client device, an internet protocol (IP) address of the first client device; using native geolocation, determining a region associated with the IP address; and using the region associated with the IP address, determining the first autonomous system.

Example 15 is the non-transitory computer-readable medium of example(s) 11 wherein the one or more metrics about the performance of the video conference in the first autonomous system include at least one of: packet loss, latency, jitter, bandwidth utilization, session type, event type, average video resolution, average frame rate, average connection time, or session disconnects.

Example 16 is a system comprising: a memory device; and one or more processors communicatively coupled to the memory device configured for: establishing a video conference including a plurality of client devices, each client device connected to an autonomous system of a plurality of autonomous systems; receiving one or more packets from the plurality of client devices; determining, from the one or more packets from the plurality of client devices, first client device information associated with a first client device of the plurality of client devices, comprising: first telemetry information about the video conference; a first autonomous system traversed by the one or more packets from the first client device; and a first communication service provider that administers the first autonomous system; storing the first client device information in association with the first communication service provider; determining, based on the first client device information stored in association with the first communication service provider, one or more metrics about performance of the video conference in the first autonomous system; and outputting in real-time the one or more metrics about the performance of the video conference in the first autonomous system to the first communication service provider.

Example 17 is the system of example(s) 16, wherein determining the first autonomous system traversed by the one or more packets from the first client device comprises: determining, from a packet from the one or more packets from the first client device, an internet protocol (IP) address of the first client device; using native geolocation, determining a region associated with the IP address; and using the region associated with the IP address, determining the first autonomous system.

Example 18 is the system of example(s) 16, wherein the one or more metrics about the performance of the video conference in the first autonomous system include at least one of: packet loss, latency, jitter, bandwidth utilization, session type, event type, average video resolution, average frame rate, average connection time, or session disconnects.

Example 19 is the system of example(s) 16, wherein the one or more packets from the first client device comprise at least one of: first packets associated with the video conference; second packets associated with video conferencing room hardware, wherein the video conferencing room hardware includes the first client device; or third packets from a synthetic network test executed on the first client device.

Example 20 is the system of example(s) 16, further comprising: accessing a machine learning (ML) model, the ML model trained to predict trends about the performance of the first autonomous system based on a plurality of client device information stored in association with the first communication service provider; determining, based on the ML model, a first trend about the performance of the first autonomous system based on the first client device information stored in association with the first communication service provider; and outputting in real-time the first trend about the performance of the first autonomous system to the first communication service provider.

That which is claimed is:
1. A computer-implemented method, comprising:
 establishing a video conference including a plurality of client devices, each client device connected to an autonomous system of a plurality of autonomous systems;

joining a first client device to the video conference, the first client device connected to a first autonomous system administered by a first communication service provider;
receiving one or more packets from the first client device;
determining, from the one or more packets from the first client device, first client device information, comprising:
   first telemetry information about the video conference;
   the first autonomous system traversed by the one or more packets from the first client device; and
   the first communication service provider that administers the first autonomous system;
storing the first client device information in association with the first communication service provider;
determining, based on the first client device information stored in association with the first communication service provider, one or more metrics about performance of the video conference in the first autonomous system; and
outputting in real-time the one or more metrics about the performance of the video conference in the first autonomous system to the first communication service provider.

2. The method of claim 1, further comprising:
joining a second client device to the video conference, the second client device connected to a second autonomous system administered by a second communication service provider;
receiving one or more packets from the second client device, wherein the one or more packets from the second client device traverse the first autonomous system and the second autonomous system;
determining, from the one or more packets from the second client device, second client device information, comprising:
   second telemetry information about the video conference;
   the first autonomous system traversed by the one or more packets;
   the first communication service provider that administers the first autonomous system;
   the second autonomous system traversed by the one or more packets; and
   the second communication service provider that administers the first autonomous system;
storing a first portion of the second client device information in association with the first communication service provider; and
storing a second portion of the second client device information in association with the second communication service provider.

3. The method of claim 1, further comprising anonymizing the first client device information.

4. The method of claim 1, wherein determining the first autonomous system from the one or more packets comprises:
   determining, from a packet from the one or more packets, an internet protocol (IP) address of the first client device;
   using native geolocation, determining a region associated with the IP address; and
   using the region associated with the IP address, determining the first autonomous system.

5. The method of claim 1, wherein the one or more metrics about the performance of the video conference in the first autonomous system include at least one of: packet loss, latency, jitter, bandwidth utilization, session type, event type, average video resolution, average frame rate, average connection time, or session disconnects.

6. The method of claim 1, wherein:
determining, from the first client device information stored in association with the first communication service provider, the one or more metrics about the performance of the video conference in the first autonomous system comprises:
   querying for information associated with the first communication service provider, wherein the information associated with the first communication service provider includes information about a plurality of packets that traverse the first autonomous system;
   determining information about network performance in the first autonomous system based on the information about the plurality of packets that traverse the first autonomous system; and
   determining the one or more metrics about the performance of the video conference in the first autonomous system based on the information about the network performance in the first autonomous system.

7. The method of claim 1, wherein the one or more packets from the first client device comprise at least one of:
   first packets associated with the video conference;
   second packets associated with video conferencing room hardware, wherein the video conferencing room hardware includes the first client device; or
   third packets from a synthetic network test executed on the first client device.

8. The method of claim 1, further comprising:
generating, using the first client device information stored in association with the first communication service provider, a reverse path trace from a video conference provider to a location inside the first autonomous system.

9. The method of claim 1, wherein determining, based on the first client device information stored in association with the first communication service provider, the one or more metrics about the performance of the video conference in the first autonomous system comprises:
   accessing the first client device information stored in association with the first communication service provider, comprising information about a plurality of packets that traversed the first autonomous system; and
   generating the one or more metrics about the performance of the video conference in the first autonomous system, comprising aggregating the information about the plurality of packets that traversed the first autonomous system.

10. The method of claim 1, wherein outputting in real-time the one or more metrics about the performance of the video conference in the first autonomous system to the first communication service provider comprises:
   accessing one or more historical metrics associated with each of the one or more metrics about the performance of the video conference in the first autonomous system; and
   generating a graphic comparing each of the one or more metrics about the performance of the video conference in the first autonomous system with an associated historical metric.

11. A non-transitory computer-readable medium storing instructions that, when executed by one or more processors, cause the one or more processors to perform a method comprising:

37 receiving one or more packets from a first client device, the first client device connected to a first autonomous system administered by a first communication service provider;
determining, from the one or more packets from the first client device, first client device information, comprising:
 a video conference including the first client device from a plurality of client devices, each client device connected to an autonomous system of a plurality of autonomous systems;
 first telemetry information about the video conference;
 the first autonomous system traversed by the one or more packets from the first client device; and
 the first communication service provider that administers the first autonomous system;
storing the first client device information in association with the first communication service provider;
determining, based on the first client device information stored in association with the first communication service provider, one or more metrics about performance of the video conference in the first autonomous system; and
outputting in real-time the one or more metrics about the performance of the video conference in the first autonomous system to the first communication service provider.

12. The non-transitory computer-readable medium of claim 11, further comprising:
receiving one or more packets from a second client device, the second client device connected to a second autonomous system administered by a second communication service provider;
determining, from the one or more packets from the second client device, second client device information, comprising:
 the video conference including the first client device and the second client device from the plurality of client devices;
 second telemetry information about the video conference;
 the first autonomous system traversed by the one or more packets from the second client device;
 the first communication service provider that administers the first autonomous system;
 the second autonomous system traversed by the one or more packets from the second client device; and
 the second communication service provider that administers the first autonomous system;
storing a first portion of the second client device information in association with the first communication service provider; and
storing a second portion of the second client device information in association with the second communication service provider.

13. The non-transitory computer-readable medium of claim 11, further comprising anonymizing the first client device information.

14. The non-transitory computer-readable medium of claim 11, wherein determining the first autonomous system from the one or more packets from the first client device comprises:
determining, from a packet from the one or more packets from the first client device, an internet protocol (IP) address of the first client device;
using native geolocation, determining a region associated with the IP address; and

38 using the region associated with the IP address, determining the first autonomous system.

15. The non-transitory computer-readable medium of claim 11 wherein the one or more metrics about the performance of the video conference in the first autonomous system include at least one of: packet loss, latency, jitter, bandwidth utilization, session type, event type, average video resolution, average frame rate, average connection time, or session disconnects.

16. A system comprising:
a memory device; and
one or more processors communicatively coupled to the memory device configured for:
 establishing a video conference including a plurality of client devices, each client device connected to an autonomous system of a plurality of autonomous systems;
 receiving one or more packets from the plurality of client devices;
 determining, from the one or more packets from the plurality of client devices, first client device information associated with a first client device of the plurality of client devices, comprising:
  first telemetry information about the video conference;
  a first autonomous system traversed by the one or more packets from the first client device; and
  a first communication service provider that administers the first autonomous system;
 storing the first client device information in association with the first communication service provider;
 determining, based on the first client device information stored in association with the first communication service provider, one or more metrics about performance of the video conference in the first autonomous system; and
 outputting in real-time the one or more metrics about the performance of the video conference in the first autonomous system to the first communication service provider.

17. The system of claim 16, wherein determining the first autonomous system traversed by the one or more packets from the first client device comprises:
determining, from a packet from the one or more packets from the first client device, an internet protocol (IP) address of the first client device;
using native geolocation, determining a region associated with the IP address; and
using the region associated with the IP address, determining the first autonomous system.

18. The system of claim 16, wherein the one or more metrics about the performance of the video conference in the first autonomous system include at least one of: packet loss, latency, jitter, bandwidth utilization, session type, event type, average video resolution, average frame rate, average connection time, or session disconnects.

19. The system of claim 16, wherein the one or more packets from the first client device comprise at least one of:
first packets associated with the video conference;
second packets associated with video conferencing room hardware, wherein the video conferencing room hardware includes the first client device; or
third packets from a synthetic network test executed on the first client device.

20. The system of claim 16, further comprising:
accessing a machine learning (ML) model, the ML model trained to predict trends about the performance of the first autonomous system based on a plurality of client device information stored in association with the first communication service provider;

determining, based on the ML model, a first trend about the performance of the first autonomous system based on the first client device information stored in association with the first communication service provider; and outputting in real-time the first trend about the performance of the first autonomous system to the first communication service provider.

\* \* \* \* \*